United States Patent [19]

Hill et al.

[11] 4,397,983

[45] Aug. 9, 1983

[54] PROCESS FOR THE PRODUCTION OF POLYURETHANE POLYMER COMPOSITIONS

[75] Inventors: Edward T. Hill; Bernard L. Kaplan; Paul V. Farkas, all of Johannesburg, South Africa

[73] Assignees: Aerofoam Industries Proprietary Limited, Boksburg North; Polyeth Marketing Proprietary Limited, Johannesburg, both of South Africa

[21] Appl. No.: 334,593

[22] Filed: Dec. 28, 1981

[30] Foreign Application Priority Data

Nov. 13, 1980 [ZA] South Africa ..................... 80/7025

[51] Int. Cl.$^3$ ............................................. C08L 75/04
[52] U.S. Cl. ................................... 524/790; 524/871; 524/872; 524/873; 524/874; 524/875; 521/110; 521/122; 521/124
[58] Field of Search ................. 524/790, 871, 872, 873, 524/874, 875, 450; 523/210; 523/211; 521/110, 122, 124

[56] References Cited

U.S. PATENT DOCUMENTS

| | | | |
|---|---|---|---|
| 3,271,352 | 9/1966 | Weinberg | 524/450 |
| 3,326,844 | 6/1967 | Gruber | 524/450 |
| 3,755,222 | 8/1973 | Gruber et al. | 524/450 |
| 4,069,192 | 1/1978 | Monte et al. | 260/37 |

*Primary Examiner*—Lewis T. Jacobs
*Attorney, Agent, or Firm*—Murray and Whisenhunt

[57] ABSTRACT

The invention is concerned with the preparation of polyurethane compositions in which the deleterious effect of gaseous by-products formed in the reaction is minimized. This is achieved by the use of coupling reagents which incorporate a steric hindrance function. The latter does not interfere with the normal coupling reactions between the coupling agent and polymer matrix and filler material but it does prevent such reaction between the coupling agent and filler material as would cause release of low molecular weight compounds occluded by the filler. Since the release of low molecular weight compounds is avoided, the formation or evolution of gases which give rise to unwanted cellularity of the cured composition is at least minimized.

26 Claims, No Drawings

PROCESS FOR THE PRODUCTION OF POLYURETHANE POLYMER COMPOSITIONS

This invention relates to polyurethane compositions and to methods for the production thereof.

Polyurethane type polymers are produced by reaction of selected isocyanate compounds and an hydroxyl-containing material such as a polyol to produce any one of a large range of polyurethane polymers which when suitably compounded, for example with selected fillers, may range from structural materials having high impact and abrasion strength to coatings, elastomers and foams having a host of different uses.

It is sometimes desired to form foamed polyurethanes and this may be achieved by the incorporation of blowing agents or at least partially inherently in the reaction by the formation of gases which become entrapped in the setting material. Thus during the reaction in which a polyurethane is formed a low molecular weight compound may be released, either as a gas or as a reactant which is responsible for the formation of a gas which becomes entrapped in the setting mass giving rise to a cellular structure. For example, during the condensation reaction between an isocyanate and a polyol the presence of water which reacts with further isocyanate starting material will give off carbon dioxide.

Where a foamed end product is required the evolution of gas that may be inherent in the reaction, depending upon the constituents of the reaction composition, is quite acceptable. Where a homogeneous solid is desired, however, the inherent blowing effect caused by the formation of water is an undesirable side effect.

In order to overcome the formation of water or other low molecular weight compound an absorbent, adsorbent or occluding filler such as a molecular sieve may be incorporated in the composition which is designed to trap the low molecular mass particles thereby alleviating the problems of the formation of a separate gas phase. A typical example of a molecular sieve used for this purpose is the Bayer-Zeolith range of materials normally added as a powder per se or as a paste in an inert or slightly active liquid such as castor oil. A suitably selected Zeolith will occlude water particles thus isolating them and preventing reaction with isocyanate. In this way a homogeneous solid polyurethane body may be formed.

It has now been discovered that the protective function of a Zeolith or similar material may be broken down by other components employed in the formation of a polyurethane composition. Thus it is known, in order to improve the qualities of polymer compositions, including polyurethanes, to add to the reaction mass suitable surfactants or physical or chemical coupling agents to activate the surfaces of the filler particles or otherwise effect the physical or chemical bonding of the filler particles to the polymer molecules. Two classes of coupling agents suitable for this purpose are the organic titanates and silanes which incorporate functions for connective reaction one to the polymer molecules and another to the filler particles. It has now been found, however, that some of these coupling agents react physically or chemically with the molecular sieves or with other occluding fillers freeing the trapped water or other low molecular mass compound with resultant disadvantages to a composition which is intended to have a homogeneous solid structure and not a cellular structure.

Shrinkage is a further disadvantage encountered in the polyurethane manufacturing industry. Shrinkage may be overcome by increasing the proportion of filler in the composition but in order to avoid consequential deterioration in the properties of the end product, coupling of the filler to the polymer compound should be effected. This necessitates an increase in the proportion of surfactant or coupling agent used which in turn increases the freeing of water or the like from the low molecular mass material trapping compound or from the filler itself. Thus while shrinkage may be reduced the disadvantage of cellular structure formation is increased and up to the present time it has not been possible to avoid one problem or the other or both.

It is an object of the present invention to provide a method for the manufacture of polyurethane compositions which include filler materials and coupling agents and in which the above described disadvantages are at least minimised or controlled.

According to the invention a method of making a polyurethane composition from polyurethane forming reactants, a filler material part at least of which is selected to occlude low molecular mass compounds in the reaction mass, and a coupling reagent for effecting physical or chemical bonding of the filler material and polyurethane compound formed in the reaction, is characterised in that the coupling reagent incorporates a steric hindrance function operative to protect the filler material against release of occluded molecules.

Thus the coupling reagent may include a suitable large function preventing chemical or physical reaction of the coupling agent and filler, or occluded compounds, by steric hindrance of that part of the coupler molecule that is responsible for the reaction to free such occluded compounds. The large function on the coupling agent does not, however, prevent coupling with the filler in order to enable it to fulfil its purpose as a coupling agent.

In a specific embodiment of the invention the filler comprises or includes a molecular sieve material or other occluding material and the coupling agent is selected from the class comprising organo titanates.

Suitable surfactants or coupling agents include titanates of the general schematic formula:

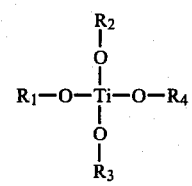

where
- $R_1$ is a group capable of reacting with an inorganic site;
- $R_4$ is a group capable of reacting with an organic polymer matrix; and
- $R_2$ and/or $R_3$ are organic functions which are sufficiently large as to effect steric hindrance between the coupling agent and the filler or its occluded molecules.

Further according to the invention the Group $R_4$ in the above formula is also sufficiently large to effect steric hindrance, and preferably $R_2$, $R_3$ and $R_4$ are identical.

Coupling agents which possess the said sufficiently large function operative to hinder release of occluded compounds include isopropyl tri-(dodecylbenzenesulfonyl) titanate and isopropyl tri-(dioctylphosphato) titanate. In these compounds $R_1$ is the isopropyl group and $R_2$, $R_3$ and $R_4$ are identical groups sufficiently bulky to provide steric hindrance and any one of which can react with the polymer matrix.

As stated above silanes are also excellent coupling agents for fillers and polyurethanes and there is no reason why silane compounds could not be produced in the same way as described above, with respect to the organo titanates, to provide a group capable of reacting with an inorganic site and a steric hindrance function permitting such reaction as well as that with the polyurethane matrix, while preventing reaction with the group $R_1$ and the inorganic filler, or its occluded compounds, particularly water, in such a way that the occluded compounds are released. Such silanes would possess a similar general schematic formula to that of the titanates, namely:

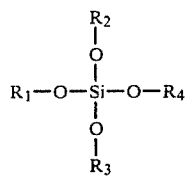

Still further according to the invention there is provided a method of reducing undesirable shrinkage in the moulding of polyurethane compositions by incorporating suitable fillers in sufficient quantity to counteract such shrinkage together with the said coupling reagent containing a steric hindrance function or functions operative to hinder the release of occluded compounds from the said filler.

It has now been found that whereas previously the use of a high proportion of filler and additional quantities of coupling reagent aggravated the release of low molecular weight compounds and the formation of cellular structures, the use of suitable coupling agents in accordance with the invention counteracts this side effect of the filler enabling it to be used in sufficient quantity to control shrinkage.

The invention is not limited to utilisation of coupling reagents having a steric hindrance function to the exclusion of the use of coupling agents which possess no such steric hindrance effect. It is possible to obtain at least a proportion of the advantages of the present invention by utilising a mixture of coupling agents part only of which possesses the steric hindrance function built into the molecule. In fact it has been discovered that some coupling agents possess a dual function, for example, being catalysts as well as couplers. Use of the dual purpose reagent without a steric hindrance function would give rise to the above stated release of low molecular weight occluded compounds. However, use of the dual purpose reagent together with a coupling agent possessing a steric hindrance function has the effect of masking the undesirable release action of the said dual purpose reagent. In fact, in some instances, such masking of a deleterious reaction provides surprising advantages in the end product.

The invention therefore also includes within its scope the use of reagents which may offer advantageous properties, but where use in a system not protected by the use of sterically hindered coupling agents in accordance with the invention, would give rise to such harmful side reactions. Such reagents may include, for example, other coupling agents, particularly those coupling agents that are known to act also as catalysts for the urethane reaction, such as isopropyl tri-(N-ethylaminoethylamino) titanate and its derivatives; and also certain surfactants used to improve the compatability of the components of the system, such as Silicone B 1048 (Th Goldschmidt). This surfactant is a surface tension increasing agent which can be tolerated due to the use of the coupling reagent including a steric hindrance function.

Thus the manufacture of polyurethane compositions according to the invention utilizing a coupling agent with a steric hindrance function and incorporating a silicone from the class of surface-tension increasing type, such as the said Silicone B 1048, plus a titanate known to act as a catalyst for polyurethane formation, such as the said isopropyl tri-(N-ethylaminoethylamino) titanate (Kenrich Petrochemicals Inc.), can achieve not only a major decrease in gel time, but the resultant cured polymer can achieve a higher glass transition temperature, for example, above 200° C. or, with certain reinforcing fillers incorporated, above 220° C.

Also according to the invention the hydroxyl-containing material for the formation of a polyurethane polymer according to the invention to form a non-foamed or controlled foam polyurethane system includes a high molecular mass polyether polyol or polymer polyol of molecular mass range 4,000 to 10,000, typical example being Voranol CP 4711, (Dow Chemical) or Niax Polyol 31-38, (Union Carbide), intimately mixed with a medium molecular mass polyether polyol of molecular mass range 250 to 600, a typical example being Voranol CP 450 (Dow Chemical) and a low molecular mass crosslinker from the class diols, triols or diamines, typical examples being DEG, DPG, MEG, 1,4-butandiol. The three types of polyol may be used together but not necessarily in any fixed proportions from the range 0–100 parts by mass.

The inorganic or other filler or fillers selected for reinforcement and improvement of the physical properties of the polyurethane system may be incorporated in the hydroxyl-containing reactant in the form of particulate, acicular or laminated particles including glass and other filaments and fibres and roving, woven and stranded constructions derived from these, beads whether hollow or solid, and any other similar materials whether pre-coated or not. Such fillers may include carbon blacks (including oxidised, derived and special types such as conductive carbons and carbon blacks and graphites), calcium and other silicate and complex silicates such as clays and talcs, calcium and other carbonates and derivatives, including Dolcrete, aluminium oxides of all types, aluminates, wood and other cellulosic dusts, polyurethane or polyisocyanurate saw dusts and other scrap or reground materials or scrap or reground material from other plastic materials, metal dusts, flakes and powders, natural and synthetic silicas, phosphates, metal oxides and sulphides, and any other suitable materials. These fillers may be used separately or in combination in proportions which may typically range from 0 to 500 parts per 100 parts of a polyol reactant. The mesh size of the particulate fillers may typically be in the size range from 20 millemicrons to 100 microns, but can in fact be any size or shape required by the desired properties of the final composite. A portion of the filler material used may be constituted by the said molecular sieve or other absorbent or adsorbent occluding fillers, suitable examples of which include the commercial materials known as Bayer Zeoliths. The Zeoliths are known to be useful to absorb, adsorb or occlude a simple compound of low molecular mass such as water, from urethane systems and hence eliminate or control foaming in the composite system.

Other fillers such as wood flour and carbon blacks, particularly those of fine particle size and/or possessing an active surface yet also tend to entrap or occlude low molecular mass materials.

It will be apparent that other additives may be incorporated in the reaction medium in order to enhance the properties of the polymeric composition prepared according to the invention. For example, self-extinguishing properties may be achieved for a non-foaming or controlled foaming polyurethane composition by the incorporation of reactive or non-reactive flame retardants in liquid, paste or powder form. Examples of such flame retardants include organophosphonates such as Fyrol 6 (Stauffer Chemical Company), other halogenated organoesters of phosphoric acid, antimony trioxide or antimony pentoxide in combination with chlorinated materials, alumina trihydrate and other suitable flame retardants either alone or in combination in amounts up to 20 parts per 100 parts polyol.

Antistatic properties in, for example, a non-foamed polyurethane shell may be achieved by the incorporation of antistatic additives such as long chain aliphatic amines and amides, phosphate esters, quarternary ammonium salts, PEG, esters and ethoxylated long chain aliphatic amines. The additives may either be added discreetly or bonded to the composition by means of surfactants or other coupling agents.

In order to illustrate the invention examples are provided below:

EXAMPLE 1

Production of polyurethane composition for the moulding of solid components having an improved homogeneous structure with minimal cellular intrusions.

A first part of the polyurethane composition containing the hydroxyl reactant, filler and sterically hindered coupling reagent according to the invention as well as various other additives was made up by intimately mixing the following components in the order and proportions indicated.

| Order of Addition | Substance | Parts by Weight | Maker/s |
|---|---|---|---|
| 1. | Voranol EP 1900 | 60 | Dow Chemicals |
| 2. | Voranol CP 450 | 20 | Dow Chemicals |
| 3. | 1,4-Butandiol | 20 | Various |
| 4. | Fyrol 6 | 10 | Stauffer |
| 5. | Baylith L paste | 10 | Bayer |
| 6. | Kenreact KR 12 | 0.27 | Kenrich |
| 7. | Thorcat 535 | 1.0 | Thor |
| 8. | Silicone B1048 | 1.0 | Th, Goldschmidt |
| 9. | Aluminium powder | 12 | Various |

After adding the fifth component of the above mix the preblend was stored for 24 hours with continual mixing during this period.

Thereafter the hydroxyl containing part of the polyurethane composition was completed by adding the rest of the components stepwise with constant stirring.

To form the polyurethane composition of the invention 13427 parts by weight of the hydroxyl containing blend, prepared as described above, are reacted with 8691 parts by weight of an isocyanate containing material, in this case crude diphenyl methylene di-isocyanate, in a manner known in the art.

The resultant polymer exhibits the advantages as described above, the coupling reagent Kenreact KR 12 of formula isopropyl tri-(dioctylphosphato) titanate, possessing the tri-(dioctylphosphato)-steric hindrance function/s, acting to prevent release of occluded low molecular weight compounds from the Baylith L paste Zeolith type filler material. Coupling of the isopropyl group and the filler material without release of occluded water or other molecules does, however, occur. One of the dioctylphosphato groups also couples with the polyurethane matrix.

EXAMPLE 2

Production of polyurethane composition for the moulding of solid components having an improved homogeneous structure with minimal cellular intrusions, and having a relatively rapid gel time coupled with a high glass transition temperature.

A first part of the polyurethane composition containing the hydroxyl reactant, filler and sterically hindered coupling reagent according to the invention as well as various other additives was made up by intimately mixing the following components in the order and proportions indicated.

| Order of Addition | Substance | Parts by Weight | Maker/s |
|---|---|---|---|
| 1. | Voranol EP 1900 | 60 | |
| 2. | Voranol CP 450 | 20 | |
| 3. | 1,4-Butandiol | 20 | |
| 4. | Fyrol 6 | 10 | |
| 5. | Baylith L paste | 10 | |
| 6. | Kenreact KR 12 | 0.27 | |
| 7. | Kenreact KR 44U | 0.4 | Kenrich |
| 8. | Silicone B 1048 | 1.0 | |
| 9. | Aluminium powder | 12 | |

After adding the fifth component of the above mix the preblend was stored for 24 hours with continual mixing during this period.

Thereafter the hydroxyl containing part of the polyurethane composition was completed by adding the rest of the components stepwise with constant stirring, components 6 and 7 both being coupling reagents except that component 6 contains a steric hindrance function while component 7 contains no such function but is, in addition, a catalyst for the urethane reaction.

To form the polyurethane composition of the invention 13367 parts by weight of the hydroxyl containing blend, prepared as described above, are reacted with 8691 parts by weight of an isocyanate containing material, in this case crude diphenyl methylene di-isocyanate, in a manner known in the art.

The resultant polymer exhibits the advantages as described above, the coupling reagent Kenreact KR 12 acting to prevent release of occluded low molecular weight compounds and also acting to mask the low molecular weight compound releasing effect of Kenreact KR 44U. The polyurethane composition produced in this example may be employed in the moulding of articles with a gel time of less than one minute and having a glass transition temperature of approximately 200° C.

Many embodiments and examples of the invention exist within the invention as set out above. The essence of the invention resides in the use of selected coupling agents possessing a steric hindrance function with respect to fillers employed in the composition, which fillers occlude low molecular weight products of reaction, thereby preventing harmful side reactions within the polyurethane systems and enhancing some of the physical and processing properties of the so-made polymer.

The invention includes within its scope polyurethane compositions manufactured by the methods described above as well as articles made therefrom.

Solid polyurethane compositions produced according to the invention are particularly well suited to the construction of articles requiring high impact and abrasion resistance such as conveyor belt idler rollers and other articles subjected to great loads.

We claim:

1. A method of making a polyurethane composition from polyurethane forming reactants, a filler material part at least of which is selected to occlude low molecular mass compounds in the reaction mass, and a coupling reagent for effecting physical or chemical bonding of the filler material and polyurethane compound formed in the reaction, characterised in that the coupling reagent incorporates a steric hindrance function operative to protect the filler material against release of occluded molecules.

2. The method of claim 1 in which the filler material includes a molecular sieve or like material operative to occlude selected reaction products of low molecular mass, and the coupling agent is selected from the class comprising silanes and organo titanates incorporating the said steric hindrance function.

3. The method of claim 2 in which the coupling agent is selected from the general schematic formula:

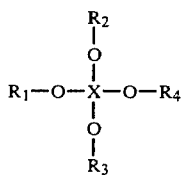

where
X is Ti or Si
$R_1$ is a group capable of reacting with an inorganic site;
$R_4$ is a group capable of reacting with an organic polymer matrix; and
$R_2$ and $R_3$ are organic functions which are sufficiently large as to effect steric hindrance between the coupling agent and the filler or its occluded molecules.

4. The method of claim 3 in which $R_4$ is also an organic group sufficiently large as to effect steric hindrance between the coupling agent and the filler or its occluded molecules.

5. The method of claim 4 in which $R_2$, $R_3$ and $R_4$ are identical.

6. The method of claim 5 in which X is Ti; $R_1$ is isopropyl and $R_2$, $R_3$ and $R_4$ are each (dodecyl benzenesulfonyl)-.

7. The method of claim 5 in which X is Ti; $R_1$ is isopropyl and $R_2$, $R_3$ and $R_4$ are each (dioctylphosphato)-.

8. The method of any one of the above claims in which the hydroxyl containing polyurethane forming reactant comprises a mixture of (a) a high molecular mass polyether polyol or polymer polyol within the molecular mass range 4000 to 10,000;
(b) a medium molecular mass polyether polyol or molecular mass range 250 to 600; and
(c) a low molecular mass crosslinker selected from the class of diols, triols and diamines.

9. The method of claim 8 in which the components (a) to (c) are intimately mixed together in the proportions 60:20:20 by weight respectively.

10. The method of claim 1 in which a catalyst for the urethane reaction is incorporated in the composition, the said catalyst normally possessing a deleterious side effect in regard to release of low molecular weight compounds occluded by a filler material component of the composition, and the said deleterious effect of the catalyst being masked by the use of the said coupling reagent which possesses a steric hindrance function.

11. The method of claim 1 in which a surfactant is incorporated in the composition.

12. The method of claim 1 in which both a catalyst for the urethane reaction and a surfactant are incorporated in the composition whereby a gel time of less than one minute is obtained and the cured composition has a glass transition temperature above 200° C.

13. The method of claim 12 in which the surfactant is a silicone material of the foam inducing type and the catalyst is isopropyl tri(N-ethylaminoethylamino) titanate.

14. A polyurethane composition comprising a polyurethane compound, a filler material occluding low molecular mass compounds in the composition, and a coupling reagent effecting physical or chemical bonding of the filler material and polyurethane compound, characterised in that the coupling reagent incorporates a steric hindrance function operative to protect the filler material against release of occluded molecules.

15. The composition of claim 14 in which the filler material includes a molecular sieve or like material operative to occlude selected reaction products of low molecular mass, and the coupling agent is selected from the class comprising silanes and organo titanates incorporating the said steric hindrance function.

16. The composition of claim 15 in which the coupling agent is selected from the general schematic formula:

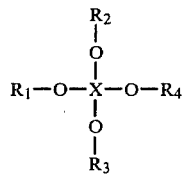

where
X is Ti or Si
$R_1$ is a group capable of reacting with an inorganic site;
$R_4$ is a group capable of reacting with an organic polymer matrix; and
$R_2$ and $R_3$ are organic functions which are sufficiently large as to effect steric hindrance between the coupling agent and the filler or its occluded molecules.

17. The composition of claim 16 in which $R_4$ is also an organic group sufficiently large as to effect steric hindrance between the coupling agent and the filler or its occluded molecules.

18. The composition of claim 17 in which $R_2$, $R_3$ and $R_4$ are identical.

19. The composition of claim 18 in which X is Ti; $R_1$ is isopropyl and $R_2$, $R_3$ and $R_4$ are each (dodecylbenzenesulfonyl)-.

20. The composition of claim 17 in which X is Ti; $R_1$ is isopropyl and $R_2$, $R_3$ and $R_4$ are each (dioctylphosphato)-.

21. The composition of any one of claims 14 to 20 in which the hydroxyl containing polyurethane forming reactant comprises a mixture of
  (a) a high molecular mass polyether polyol or polymer polyol within the molecular mass range 400 to 10,000;
  (b) a medium molecular mass polyether polyol of molecular mass range 250 to 600; and
  (c) a low molecular mass crosslinker selected from the class of diols, triols and diamines.

22. The composition of claim 21 in which the components (a) to (c) are intimately mixed together in the proportions 60:20:20 by weight respectively.

23. The composition of claim 14 in which a catalyst for the urethane reaction is incorporated in the composition, the said catalyst normally possessing a deleterious side effect in regard to release of low molecular weight compounds occluded by a filler material component of the composition, and the said deleterious effect of the catalyst being masked by the use of the said coupling reagent which possesses a steric hindrance function.

24. The composition of claim 14 in which a surfactant is incorporated in the composition.

25. The composition of claim 14 in which both a catalyst for the urethane reaction and a surfactant are incorporated in the composition, the cured composition having a glass transition temperature above 200° C.

26. The composition of claim 25 in which the surfactant is a silicone material of the foam including type and the catalyst is isopropyl tri (N-ethylaminoethylamino) titanate.

* * * * *